United States Patent [19]

Ebskamp

[11] 4,217,372

[45] Aug. 12, 1980

[54] METHOD FOR IMPROVING THE STRUCTURAL PROPERTIES OF FATS

[76] Inventor: Hermanus J. G. Ebskamp, 7, 2e Industrieweg, Lopik, Netherlands

[21] Appl. No.: 879,440

[22] Filed: Feb. 21, 1978

Related U.S. Application Data

[63] Continuation of Ser. No. 681,702, Apr. 29, 1976, Pat. No. 4,087,565, which is a continuation of Ser. No. 570,888, Apr. 23, 1975, abandoned, which is a continuation of Ser. No. 353,814, Apr. 23, 1973, abandoned, which is a continuation-in-part of Ser. No. 70,997, Sep. 10, 1970, abandoned.

[30] Foreign Application Priority Data

Sep. 11, 1969 [NL] Netherlands ................... 6913846
Feb. 17, 1970 [NL] Netherlands ................... 7002216

[51] Int. Cl.$^2$ .............................................. A23D 3/02
[52] U.S. Cl. ..................................... 426/603; 426/607
[58] Field of Search ............... 426/601, 602, 603, 606, 426/663, 664

[56] References Cited

U.S. PATENT DOCUMENTS

| | | | |
|---|---|---|---|
| 2,973,269 | 2/1961 | Melnick | 426/603 |
| 3,455,699 | 7/1969 | Bell et al. | 426/606 |
| 3,634,100 | 1/1972 | Merksem et al. | 426/603 |

Primary Examiner—Robert A. Yoncoskie
Attorney, Agent, or Firm—Blanchard, Flynn, Thiel, Boutell & Tanis

[57] ABSTRACT

The invention relates to a method for improving the structure of fats, and preferably margarines, by cooling a fat composition or an aqueous fat suspension with at least 40% of liquid oils to 25°–40° C. thereby removing 5–70% of the latent heat of crystallization of the fat components which are crystallizable above 10° C. and subjecting said mass after removal of the desired heat of crystallization to a stirring action without further cooling. After a temperature rise of at least 0.5° C. and not higher than 0.5° C. below the melting point of the fat composition, the fat composition or suspension is further cooled to below about 20° C.

6 Claims, 1 Drawing Figure

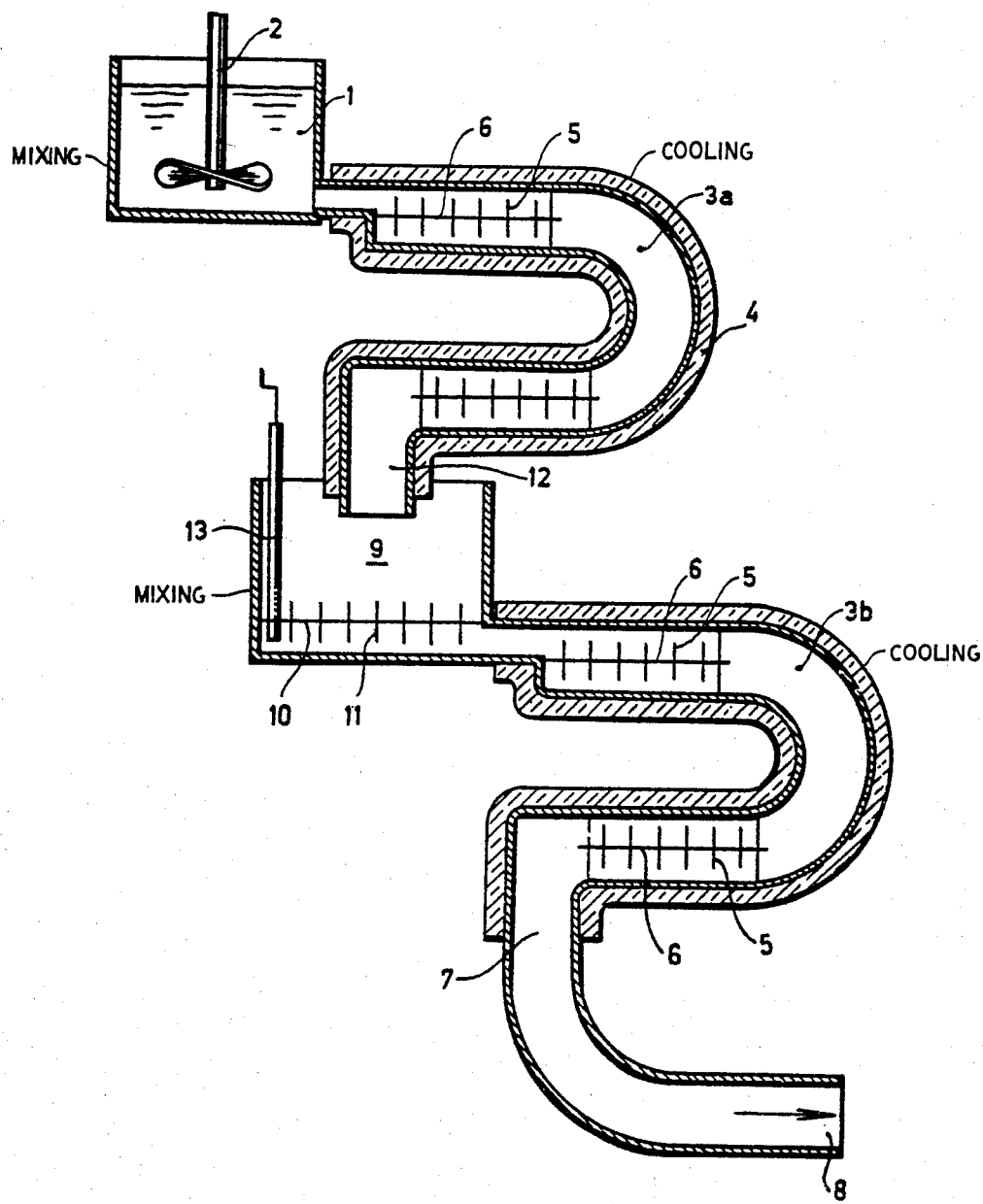

METHOD FOR IMPROVING THE STRUCTURAL PROPERTIES OF FATS

CROSS REFERENCE TO RELATED APPLICATION

This application is a continuation of Ser. No. 681 702, filed Apr. 29, 1976, now U.S. Pat. No. 4,087,565 which in turn is a continuation of Ser. No. 570,888, filed Apr. 23, 1975, now abandoned, which in turn is a continuation of Ser. No. 353 814, filed Apr. 23, 1973, now abandoned, which in turn is a continuation-in-part of Ser. No. 70997, filed Sept. 10, 1970, now abandoned.

DISCUSSION OF THE PRIOR ART

My invention relates to a method for improving the structure, particularly the crystal structure of fats, on cooling a molten fat or preferably a composition containing at least suspended molten fat in an aqueous medium.

It is commonly known to prepare fat compositions by cooling liquid fats or aqueous emulsions of fats. Very often, however, the fat products obtained leave much to be desired as to taste and other properties. The less favourable properties seem to be connected with the fact that during cooling the desired crystal structure is not obtained and owing thereto the taste, spreading qualities and other physical properties are impaired. Moreover the microbiological deterioration is rather high.

In order to obtain outstanding properties of the final product a very specific crystal structure is required.

DESCRIPTION OF A PREFERRED EMBODIMENT

It is an object of the invention to provide a method by which these difficulties are obviated and which provides fat compositions with an optimally desired crystal structure and a very high resistance to microbiological deterioration.

This object is attained according to the invention by a method for improving the structure, particularly the crystal structure, by the steps of cooling a molten fat or preferably a composition of molten fat in an aqueous medium, removing the whole composition after cooling down to a temperature comprised between 20° C. and 2° C. below the melting point of the fat from the cooling zone, subjecting same to a mechanical treatment without external cooling thereby allowing the temperature to rise up for at least 0.5° and to at most 0,5° C. below the melting point of the composition and before subjecting the composition to said mechanical treatment removing 5 to 70% of the total latent heat of crystallisation of the fat components being crystallisable above 10° C. and after said mechanical treatment the composition is further cooled to a temperature below 20° C.

Preferably 10 to 40% of the total latent heat of crystallization is removed before the mechanical treatment is started. It is not preferred to cool below 23° C. in the first cooling step.

Preferably the temperature of the mixture, after same has been removed from the cooling zone is allowed to rise at least 0.5° C. while it is further very advantageous to allow the composition, prior to the removal of same from the cooling zone, to cool down to a temperature which at most is 25° C. below the melting temperature of the composition.

When using the aforementioned measure according to the invention it has been found that a very satisfactory improvement as to taste, spreading qualities and other physical properties is obtained probably because a very specific crystal structure is obtained which is also determined by the mixture selected as composition of the raw materials.

It should be noted that the U.S. Pat. No. 2.973.269 describes a method for treating a liquid margarine comprising superchilling a liquid margarine to a temperature of about 10° to 40° F. below the setting point of the fat ingredient thereof, the setting point being 70° to 80° F. After said cooling the liquid margarine is subjected to working in a storage vessel, during said working the temperature rises about 6° to 30° F. However, this method is particularly not suitable for improving the qualities of margarines containing 40% of liquid oils. Moreover the microbiological spoilage of the fat components is higher in the products according to the known process than in the process of the invention. The same holds for the crystal structure.

The term "fat mixture" is meant to cover mixtures which contain natural fats, fat oils, including interesterified fats and fat oils or fats and fat oils which have been subjected to other treatments, these fats or fat oils being of vegetable or animal origin.

The fat mixture is employed advantageously as an emulsion of fat mixture in water from which emulsions e.g. margarines can be prepared.

The composition of the fat mixtures can vary within wide limits, provided the condition is satisfied that a product with spreading qualities can be obtained.

By melting points in the foregoing are understood the so called melting slip points as defined in the book of Bailey: "Melting and solidification of fats" 1950, page 110

It has further been found that according to the method in conformity with the invention fat mixtures can be used which contain at least 40% liquid oils with a high percentage of multiple unsaturated fatty acids, while the rest consists of a fat possibly in an interesterified condition or a mixture of fats, one fat of which consists of a hardened fat and other is a partially hardened fat.

DESCRIPTION OF A PREFERRED EMBODIMENT

According to a preferred embodiment a margarine with at least 50% multiple unsaturated fatty acids is obtained by starting from a water in "oil" emulsion in which the fat mixture contains at least 84% liquid oils and 2-5% of an animal or vegetable fat with a melting point of over 60° C. and 8-11% of an animal or vegetable fat with a melting point ranging from 35° to 55° C., whereupon the emulsion after having been treated and cooled down to a temperature of at least 10° C. under the melting point of the emulsion, but not lower than 25° C. below the melting point of the emulsion and after having removed 25% of the latent heat of crystallisation of fat components being crystallisable above 10° C. is subjected to a mechanical treatment until the temperature of the emulsion from the beginning of the mechanical treatment has risen with at least 2° C. but maximally with at most 8° C., after which the emulsion whilst being treated is further cooled down to below 20° C.

Advantageously an emulsion is manufactured using a fat mixture of 84-90% of liquid oils, 2-5% of a vegetable fat with a melting point of 61° C. and 8-11% of a vegetable fat with a melting point of 42° C., which emulsion is cooled down from a temperature of 5° above the melting point of the emulsion to a temperature which is 20° lower than the starting temperature of the emulsion, whereupon this emulsion after removal of 30% of the latent heat of crystallisation of the fat components which are crystallisable above +10° C. is only subjected to a mechanical treatment without cooling until the temperature of the emulsion has risen 4° C. and subsequently, whilst treating, is cooled down to a final temperature of below 20°, preferably from 5° to 15° C.

The 2–5% fat, of said mentioned fat consists preferably of a hardened or completely hydrogenated fat e.g. obtained by hardening partially palm oil or hydrogenating completely soya bean oil.

The quantity of 8–11% of a hardened vegetable fat with a melting point ranging from 35° to 45° for the preparation of such a margarine is preferably obtained by hardening a refined palm oil to a melting point of 45° C., but also any other vegetable oil can be used which can be hydrogenated to this melting point.

In this way it becomes possible to obtain a very particular crystal synthesis differing from the normal structure, whereby a product is obtained which compares favourably with the product prepared without using the aforementioned measure, since the product according to the method of the invention is not too tacky and does not constitute a so called "long" product.

Liquid oils with a high percentage of multiple unsaturated fatty acids are e.g. sunflower oil, maize oil or soya bean oil and are not crystallisable at 10° C.

As fats with a melting point of 61° C. and of 42° C. are products e.g. obtained by hardening palm oil and sunflower products.

In preparing the emulsion such a quantity of water is admixed to the fat mixture that the total emulsion obtained contains 16% by weight of water. The emulsion is then warmed up to 50° C. and emulsified, and cooled down to 30° C. in such a way that the temperature of 1 kg margarine can be advantageously reduced to 30° C. in half a minute and at the same time 25% of the latent heat of crystallisation of fat components which are crystallisable above 10° C. will be removed. By margarine is here understood a product with e.g. 16% water and preferably 84% fat. However, the fat content may be considerably lower.

The method according to the invention can be performed by means of a device like the one diagrammatically represented in the drawing.

This device consists of a mixing vessel 1 with an agitator 2 for stirring the fats or for the formation of an emulsion from the oils, fats and water. A pipe line with parts 3a and 3b each of which is provided with a cooling jacket 4, through which a cooling medium can be passed, is provided for cooling the composition in the form of a fat mixture or an emulsion. During cooling the shafts 6 with pins 5 ensures the treatment of the mixture. Through the outlet 7 of the pipe line part 3b the prepared composition either in the form of a fat mixture, or a margarine, is sent to the storage or packing department 8.

A treatment vessel 9 with a second rotating shaft 10 with pins 11 is provided in order to subject the composition to a mechanical treatment in the zone between the parts 3a and 3b. In the pipe line part 3a an outlet 12 is provided for the discharge of the cooled mixture from the pipe line part 3a so that it can be introduced into the treatment vessel 9.

Means can be provided, e.g. a thermometer 13, in the treatment vessel 9 for checking the temperature of the mixture contained therein. The rise of temperature in the treatment vessel 9 can also be achieved by means regulating the period of time for which the mixture stays in the vessel 9. These means may consist of valves or the like. It should be emphasized that the whole composition is removed from the cooling zone.

The invention will hereinafter be clarified with reference to a number of examples.

The microbiological spoilage has been determined according to the ASTM standard and the taste by a panel. The values are given by symbols 1 to 10.

EXAMPLE I

Into a mixing vessel, provided with an agitator, is introduced a quantity of 840 kg liquid oils with a high percentage of unsaturated fatty acids in the form of sunflower oil, and thereupon 100 kg of a hardened or interesterified fat with a melting range comprised between 30° to 45° C., 60 kg refined palm oil hardened to a melting point of 45° C. and finally 224 kg water and ingredients like colouring and well known margarine emulsifying agents and the like.

The mixture is brought to a temperature of 50° whilst stirring whereby an emulsion is obtained. The total latent heat of crystallisation of the fat components crystallisable above 10° C. in the above fat mixture amounts to 3200 k cal.

This emulsion is cooled down to a temperature of 30° C. in a cooling plant, known per se in the margarine industry in the shape of a pipe line part 3a, due to mechanical treatment by means of pins 5. The speed of transport through pipe line part 3a is controlled such that the temperature decreases to 30° C. and at the same time 10% of the total latent heat of crystallisation of the fat components crystallizable above 10° C. is removed. Thereupon the cooling operation is discontinued and the mixture is transferred to a non-cooled treatment vessel 9 in which due to treatment by means of pins 11 the temperature of the mixture is allowed to rise up to 37° C. Subsequently whilst performing further treatment the mixture is cooled down to 10° C. The margarine is then ready for packing and has a very good taste and a microbiological value of 9.

Similar results are obtained by cooling to 30° C. and removing 40% of the total latent heat of crystallisation and a subsequent temperature rise during mechanical treatment without further cooling to 36° C.

Good results are also obtained by removing 25% of the total latent heat of crystallisation and a subsequent temperature rise to 35° C.

For removing the desired heat of crystallisation the cooling is controlled. It is also possible to maintain the total cooling capacity of the installation but to heat the composition to a higher temperature. In this way a part of the cooling agent is used for removing the heat content above the melting point.

Instead of the aforementioned proportions it is also possible to use mixtures of 84–90 parts by weight of a liquid oil (soyabean oil) and 10–16 parts of a solid fat, wherein from 2–5 parts of the solid fat is composed of a vegetable fat with a melting point up to 61° C. and 8–11 parts of the solid fat is of a fat having a melting point of 42° C. 6 to 9% of this vegetable fat is interesterified. The solid fat ingredients of this mixture have a latent heat of crystallisation of 2000–3200 k cal. 20% of the total latent heat is removed whereafter the temperature is allowed

EXAMPLE II

In a mixer 870 kg soya bean oil are mixed with 130 kg of inter-esterified and subsequently hardened fat with a melting range comprised between 30° to 45° C. This mixture together with 224 kg water and other margarine ingredients is converted into an emulsion and treated in the same way as in example I, while the temperature of the mixture in the treatment vessel is allowed to rise up to 40° C. after cooling to a temperature for a sufficient time to remove 20% of the latent heat of crystallisation of the fat ingredient of the mixture (2600 k Cal). Thereupon cooling is effected to a final temperature of 10° C. The taste is estimated to be very good and the microbiological value is 8.

EXAMPLE III

A fat mixture consisting of 900 kg palm kernel fat and 100 kg of palm oil is hardened to an iodine addition value of less than 1. Thereupon the product is interesterified. 200 kg weight of this fraction are mixed with 800 kg of soya bean oil whereupon this mixture after being suspended in 224 kg water is brought to the melting temperature of 43° C. and subsequently cooled down to 26° C. After 30% of the total latent heat of crystallisation of the above-described fat mixture, said 30% corresponding to 1200 k Cal has been removed, the mixture is removed from the cooling area, and treated in a vessel by means of pins without further cooling until the temperature has risen to 38° C. Thereupon the mixture is further cooled down to 10° C. It appears that the taste of the product has considerably improved.

EXAMPLE IV

A palm oil is hydrogenated to a melting point of 45° C., this hardened fat is heated to a temperature of 50° C., cooled down to 30° C., whereupon the hardened fat is removed from the cooling area and treated by means of pins, without being subjected to cooling, until the fat has a temperature of 34° C. whereupon the fat is cooled down to 20° C. The structure of this product is considerably better than in the case of direct cooling. During first cooling to 30° C. 40% of the latent heat is removed. The microbiological value is 8. The total latent of heat crystallisation amounts to 20 k Cal/kg.

A product with a less improved structure is likewise obtained when the aforementioned treatments are repeated with the exception, however, that the temperature is allowed to rise to only 31° C., in this case the structure is, however, slightly inferior as compared with the structure obtained in the event of a rise of temperature up to 34° C.

By removing 5% of the total latent heat of crystallisation and maintaining the other conditions an improved taste, but only a microbiological value of 7 is obtained.

By removing 70% of the latent heat of crystallisation the taste is improved but less than by removing 35% of the total latent heat of crystallisation, the microbiological value is 7.

It has been found that it is recommended to cool down the composition, prior to subjecting it to the exclusive mechanical treatment, to a temperature of at least 6° C. below the melting point of the composition, but not under a temperature which is 25° C. under the aforementioned melting point and not below 23° C.

to rise to 34° C. The taste is excellent and the microbiological value is 8.

EXAMPLE V

Into the mixing vessel 1 is introduced a quantity of 840 kg of liquid oils with a high percentage of multiple unsaturated fatty acids namely sunflower oil, thereupon 50 kg fully hardened palm oil with a melting point of 60° C., 110 kg of refined hardened palm oil with a melting point of 45° C. are admixed, after which 224 kg water and ingredients like colouring substance and emulsifying agents are added.

The quantities of the latter substances can by easily established by those skilled in the art.

The mixture is brought up to a temperature of 50° whilst stirring whereby an emulsion is obtained.

This emulsion is cooled down to a temperature of 30° C., thereby removing 20% of the total latent heat of crystallisation of the fat components crystallisable at or above 10° C. in the above fat-oil mixture, that is 20% of 3200 kCal. Thereupon the cooling operation is discontinued and the temperature of the mixture in vessel 9 is allowed to rise up to 32°. Subsequently whilst performing further treatment the mixture is cooled down to 10° C. in the pipe line part 3b whereupon via the discharge opening 7 the margarine is sent to the station 8. The taste is excellent and the microbiological value is 9.

EXAMPLE VI

As in the example I 870 kg soya bean oil, 40 kg fully hardened palm oil with a melting point of 60° C. and 90 kg refined hardened palm oil with a melting point of 45° C. are mixed. This mixture together with 224 kg water and ingredients is converted into an emulsion in the same way as in example I. The emulsion is cooled to 30° C. thereby removing 40% of the total latent heat of crystallisation of the fat components being crystallizable at or above 10° C. in the above fat oil mixture, which amounts to 40% of 2600 kCal.

The temperature of the mixture in the treatment vessel is allowed to rise 8° C. and the mixture is finally cooled down to a final temperature of 10° C. The taste is excellent and the microbiological value is 8.

EXAMPLE VII

This is a reference example. The example VI is repeated however the emulsion is rapidly cooled to 17° C. thereby removing 10% of the total latent heat of crystallisation of the fat components in the fat-oil mixture of Example VI, whereafter the temperature is allowed to rise for 8° C. The end product has an insufficient quality and taste and is partly improved by removing 40% of the total latent heat of crystallisation during said cooling. It appears that cooling of the feed material must not be continued beyond 23° C. before the feed is sent to the second non cooled working zone and at the same time 10 to 40% of the total latent heat of crystallisation is removed before conveying the feed to the non-cooled zone.

The latent heat of crystallisation of each component of the feed can be determined by means of a normal calorimeter, whereafter the total latent heat of crystallization of each composition can be calculated.

What I claim is:

1. A process for producing margarine, which consists essentially of the steps of:
   feeding into a first zone a water-in-oil emulsion wherein the oil phase is a molten fat mixture consisting essentially of (a) from 40% to 90% by weight of liquid oil containing a high percentage of polyunsaturated fatty acids, said liquid oil being not crystallisable at 10° C., and (b) the balance is a fat of animal or vegetable origin having a melting point of at least 30° C., and in said first zone cooling said emulsion to a first temperature of between 20° C., as a lower limit, and at least 2° C. below the melting point of said fat in said emulsion, as an upper limit, and simultaneously agitating the emulsion in the first zone, whereby to remove from 5 to 70% of the total latent heat of crystallisation of the fat components of the emulsion which crystallise at a temperature of above 10° C., then discontinuing cooling of said emulsion after it has reached said first temperature and feeding said emulsion into a second non-cooled zone and therein subjecting said emulsion to mechanical working and agitation, without cooling said emulsion, to cause the temperature of said emulsion to rise at least 0.5° C. and up to a maximum temperature which is at least 0.5° C. below the melting point of said fat in said emulsion, then after said emulsion has reached said second temperature, feeding said emulsion into a third cooled zone and therein cooling said emulsion to a temperature below 20° C. while continuing to agitate said emulsion.

2. A process according to claim 1 in which said liquid oil is selected from the group consisting of sunflower oil, soybean oil and corn oil.

3. A process according to claim 2 in which from 10 to 40% of the total latent heat of crystallisation of fat components is removed in said first zone, and the lower limit of said first temperature is 23° C.

4. A process according to claim 2 in which said (b) fat is a mixture of a hardened fat and a partially hardened fat.

5. A process according to claim 2 in which the starting temperature of the emulsion is about 50° C.

6. A process according to claim 2 in which said first temperature is from at least 6° C. to not more than 25° C. below the melting point of said fat in said emulsion and not below 23° C.

* * * * *